US008756153B1

(12) United States Patent
Rolf

(10) Patent No.: US 8,756,153 B1
(45) Date of Patent: Jun. 17, 2014

(54) SYSTEM AND METHOD FOR MOBILE PAYMENT AT POINT OF SALE

(71) Applicant: GoFigure Payments, LLC, Paola, KS (US)

(72) Inventor: Devon A. Rolf, Paola, KS (US)

(73) Assignee: GoFigure Payments, LLC, Paola, KS (US)

(*) Notice: Subject to any disclaimer, the term of this patent is extended or adjusted under 35 U.S.C. 154(b) by 0 days.

(21) Appl. No.: 13/959,364

(22) Filed: Aug. 5, 2013

Related U.S. Application Data

(63) Continuation of application No. 13/588,064, filed on Aug. 17, 2012, now Pat. No. 8,504,472, which is a continuation of application No. 13/447,662, filed on Apr. 16, 2012, now Pat. No. 8,249,982, which is a continuation of application No. 12/973,361, filed on Dec. 20, 2010, now Pat. No. 8,224,746, which is a continuation of application No. 12/774,464, filed on May 5, 2010, now Pat. No. 7,856,387, which is a continuation of application No. 10/668,409, filed on Sep. 23, 2003, now Pat. No. 7,720,762, said application No. 13/447,662 is a continuation of application No. 12/913,563, filed on Oct. 27, 2010, which is a continuation of application No. 11/434,939, filed on May 16, 2006, now abandoned, which is a continuation of application No. 09/635,935, filed on Aug. 10, 2000, now Pat. No. 7,376,583.

(60) Provisional application No. 60/415,894, filed on Oct. 3, 2002, provisional application No. 60/147,987, filed on Aug. 10, 1999.

(51) Int. Cl.
*G06Q 40/00* (2012.01)
(52) U.S. Cl.
USPC .............................................. 705/38; 705/40

(58) Field of Classification Search
USPC .............................. 705/7.11–7.42, 38, 35, 40
See application file for complete search history.

(56) References Cited

U.S. PATENT DOCUMENTS 3,652,795 A 3/1972 Wolf et al.
3,906,460 A 9/1975 Halpem
(Continued)

FOREIGN PATENT DOCUMENTS

GB 2066540 A 7/1981
WO 8303018 A1 9/1983
(Continued)

OTHER PUBLICATIONS

U.S. Appl. No. 60/131,785, filed Apr. 30, 1999; Title: Virally Marketed Wallet Software for Portable Computers; Applicant(s): Levchin, Max et al.

(Continued)

*Primary Examiner* — Justin M Pats
*Assistant Examiner* — Benjamin S Fields
(74) *Attorney, Agent, or Firm* — Erise IP, P.A.

(57) ABSTRACT

A method for making an electronic payment system available to a plurality of users includes storing payment account information for a first user and biometric information of the first user. Before allowing the first user to make a payment with the first user's payment account, biometric information identifying the first user is received and compared to the stored biometric information of the first user. Biometric information of a second user, who is a family member of the first user, is stored to enable confirmation of the identity of the family member as a security measure in said electronic payment system.

21 Claims, 4 Drawing Sheets

(56) References Cited

U.S. PATENT DOCUMENTS

| | | |
|---|---|---|
| 3,971,916 A | 7/1976 | Moreno |
| 4,004,133 A | 1/1977 | Hannan et al. |
| 4,053,735 A | 10/1977 | Foudos |
| 4,092,524 A | 5/1978 | Moreno |
| 4,211,919 A | 7/1980 | Ugon |
| 4,277,837 A | 7/1981 | Stuckert |
| 4,298,793 A | 11/1981 | Melis et al. |
| 4,341,951 A | 7/1982 | Benton |
| 4,454,414 A | 6/1984 | Benton |
| 4,460,965 A | 7/1984 | Trehn et al. |
| 4,482,802 A | 11/1984 | Aizawa et al. |
| 4,498,000 A | 2/1985 | Decavaele et al. |
| 4,536,647 A | 8/1985 | Atalla et al. |
| 4,575,621 A | 3/1986 | Dreifus |
| 4,634,845 A | 1/1987 | Hale et al. |
| 4,689,478 A | 8/1987 | Hale et al. |
| 5,025,373 A | 6/1991 | Keyser, Jr. et al. |
| 5,157,717 A | 10/1992 | Hitchcock |
| 5,159,592 A | 10/1992 | Perkins |
| 5,179,373 A | 1/1993 | John |
| 5,221,838 A | 6/1993 | Gutman et al. |
| 5,231,571 A | 7/1993 | D'Agostino |
| 5,245,535 A | 9/1993 | Weiss et al. |
| 5,269,020 A | 12/1993 | Kakimoto |
| 5,276,311 A | 1/1994 | Henige |
| 5,329,589 A | 7/1994 | Fraser et al. |
| 5,383,113 A | 1/1995 | Kight et al. |
| 5,440,634 A | 8/1995 | Jones et al. |
| 5,469,497 A | 11/1995 | Pierce et al. |
| 5,484,988 A | 1/1996 | Hills et al. |
| 5,524,073 A | 6/1996 | Stambler |
| 5,534,683 A | 7/1996 | Rankl et al. |
| 5,557,516 A | 9/1996 | Hogan |
| 5,559,895 A | 9/1996 | Lee et al. |
| 5,590,196 A | 12/1996 | Moreau |
| 5,606,496 A | 2/1997 | D'Agostino |
| 5,623,547 A | 4/1997 | Jones et al. |
| 5,633,930 A | 5/1997 | Davis et al. |
| 5,650,604 A | 7/1997 | Marcous et al. |
| 5,657,373 A | 8/1997 | Hermansson et al. |
| 5,657,389 A | 8/1997 | Houvener |
| 5,659,165 A | 8/1997 | Jennings et al. |
| 5,677,955 A | 10/1997 | Doggett et al. |
| 5,739,511 A | 4/1998 | Pedersen |
| 5,778,178 A | 7/1998 | Arunachalam |
| 5,789,733 A | 8/1998 | Jachimowicz et al. |
| 5,790,674 A | 8/1998 | Houvener et al. |
| 5,796,832 A | 8/1998 | Kawan |
| 5,806,045 A | 9/1998 | Biorge et al. |
| 5,825,856 A | 10/1998 | Porter et al. |
| 5,826,241 A | 10/1998 | Stein et al. |
| 5,832,464 A | 11/1998 | Houvener et al. |
| 5,848,400 A | 12/1998 | Chang |
| 5,866,889 A | 2/1999 | Weiss et al. |
| 5,870,722 A | 2/1999 | Albert et al. |
| 5,878,337 A | 3/1999 | Joao et al. |
| 5,884,290 A | 3/1999 | Smorodinsky et al. |
| 5,887,266 A | 3/1999 | Heinonen et al. |
| 5,890,052 A | 3/1999 | Read et al. |
| 5,903,873 A | 5/1999 | Peterson et al. |
| 5,903,874 A | 5/1999 | Leonard et al. |
| 5,915,023 A | 6/1999 | Bernstein |
| 5,943,624 A | 8/1999 | Fox et al. |
| 5,949,044 A | 9/1999 | Walker et al. |
| 5,963,647 A | 10/1999 | Downing et al. |
| 5,969,968 A | 10/1999 | Pentel |
| 5,983,094 A | 11/1999 | Altschul et al. |
| 5,987,429 A | 11/1999 | Maritzen et al. |
| 5,987,500 A | 11/1999 | Arunachalam |
| 5,991,749 A | 11/1999 | Morrill, Jr. |
| 5,992,738 A | 11/1999 | Matsumoto et al. |
| 5,993,047 A | 11/1999 | Novogrod et al. |
| 5,999,807 A | 12/1999 | Kaplan et al. |
| 6,015,092 A | 1/2000 | Postlewaite et al. |
| 6,016,480 A | 1/2000 | Houvener et al. |
| 6,029,144 A | 2/2000 | Barrett et al. |
| 6,029,151 A | 2/2000 | Nikander |
| 6,032,133 A | 2/2000 | Hilt et al. |
| 6,038,552 A | 3/2000 | Fleischl et al. |
| 6,039,250 A | 3/2000 | Ito et al. |
| 6,040,783 A | 3/2000 | Houvener et al. |
| 6,047,270 A | 4/2000 | Joao et al. |
| 6,058,382 A | 5/2000 | Kasai et al. |
| 6,069,896 A | 5/2000 | Borgstahl et al. |
| 6,070,141 A | 5/2000 | Houvener et al. |
| 6,070,150 A | 5/2000 | Remington et al. |
| 6,076,068 A | 6/2000 | DeLapa et al. |
| 6,092,053 A | 7/2000 | Boesch et al. |
| 6,098,053 A | 8/2000 | Slater |
| 6,112,304 A | 8/2000 | Clawson |
| 6,119,106 A | 9/2000 | Mersky et al. |
| 6,125,349 A | 9/2000 | Maher |
| 6,131,810 A | 10/2000 | Weiss et al. |
| 6,144,848 A | 11/2000 | Walsh |
| 6,154,879 A * | 11/2000 | Pare et al. ............ 705/35 |
| 6,164,528 A | 12/2000 | Hills et al. |
| 6,202,055 B1 | 3/2001 | Houvener et al. |
| 6,212,556 B1 | 4/2001 | Arunachalam |
| 6,233,568 B1 | 5/2001 | Kara |
| 6,246,996 B1 | 6/2001 | Stein et al. |
| 6,260,024 B1 | 7/2001 | Shkedy |
| 6,283,366 B1 | 9/2001 | Hills et al. |
| 6,324,526 B1 | 11/2001 | D'Agostino |
| 6,330,544 B1 | 12/2001 | Walker et al. |
| 6,338,050 B1 | 1/2002 | Conklin et al. |
| 6,347,305 B1 | 2/2002 | Watkins |
| 6,354,490 B1 | 3/2002 | Weiss et al. |
| 6,354,491 B2 | 3/2002 | Nichols et al. |
| 6,374,231 B1 | 4/2002 | Bent et al. |
| 6,397,194 B1 | 5/2002 | Houvener et al. |
| 6,424,249 B1 | 7/2002 | Houvener |
| 6,434,159 B1 | 8/2002 | Woodward et al. |
| 6,438,528 B1 | 8/2002 | Jensen et al. |
| 6,496,851 B1 | 12/2002 | Morris et al. |
| 6,553,346 B1 | 4/2003 | Walker et al. |
| 6,601,761 B1 | 8/2003 | Katis |
| 6,609,113 B1 | 8/2003 | O'Leary et al. |
| 6,611,913 B1 | 8/2003 | Carroll et al. |
| 6,615,191 B1 * | 9/2003 | Seeley ............ 705/54 |
| 6,664,922 B1 | 12/2003 | Fan |
| 6,678,664 B1 | 1/2004 | Ganesan |
| 6,694,300 B1 | 2/2004 | Walker et al. |
| 6,704,714 B1 | 3/2004 | O'Leary et al. |
| 6,747,547 B2 | 6/2004 | Benson |
| 6,754,636 B1 | 6/2004 | Walker |
| 6,757,408 B2 | 6/2004 | Houvener |
| 6,829,588 B1 | 12/2004 | Stoutenburg et al. |
| 6,859,134 B1 | 2/2005 | Heiman et al. |
| 6,868,391 B1 | 3/2005 | Hultgren |
| 6,876,979 B2 | 4/2005 | Ling |
| 6,898,299 B1 * | 5/2005 | Brooks ............ 382/115 |
| 6,950,536 B2 | 9/2005 | Houvener |
| 7,043,441 B1 | 5/2006 | Maher |
| 7,082,412 B1 | 7/2006 | Treider et al. |
| 7,089,208 B1 | 8/2006 | Levchin et al. |
| 7,104,443 B1 | 9/2006 | Paul et al. |
| 7,110,981 B1 | 9/2006 | Sidikman et al. |
| 7,120,608 B1 | 10/2006 | Gallagher et al. |
| 7,133,846 B1 | 11/2006 | Ginter |
| 7,146,341 B1 | 12/2006 | Light et al. |
| 7,216,144 B1 | 5/2007 | Morris et al. |
| 7,233,992 B1 | 6/2007 | Muldoon et al. |
| 7,249,055 B1 | 7/2007 | Elder |
| RE40,220 E | 4/2008 | Nichols et al. |
| 7,376,583 B1 | 5/2008 | Rolf |
| 7,475,043 B2 | 1/2009 | Light et al. |
| 7,483,856 B2 | 1/2009 | Likourezos et al. |
| 7,512,563 B2 | 3/2009 | Likourezos et al. |
| 7,567,937 B2 | 7/2009 | Likourezos et al. |
| 7,577,609 B1 | 8/2009 | Maher |
| 7,599,881 B2 | 10/2009 | Likourezos et al. |
| 7,610,244 B2 | 10/2009 | Likourezos et al. |
| 7,627,528 B2 | 12/2009 | Likourezos et al. |
| 7,676,431 B2 | 3/2010 | O'Leary et al. |

(56) References Cited

U.S. PATENT DOCUMENTS

| | | | |
|---|---|---|---|
| 7,840,486 B2 | 11/2010 | D'Agostino | |
| 7,962,409 B2 | 6/2011 | O'Leary et al. | |
| 8,036,988 B2 | 10/2011 | D'Agostino | |
| 2001/0016835 A1 | 8/2001 | Hansmann et al. | |
| 2002/0016769 A1 | 2/2002 | Barbara et al. | |
| 2002/0052841 A1 | 5/2002 | Guthrie et al. | |
| 2002/0138351 A1 | 9/2002 | Houvener et al. | |
| 2002/0152160 A1 | 10/2002 | Allen-Rouman et al. | |
| 2002/0152168 A1 | 10/2002 | Neofytides et al. | |
| 2003/0004868 A1 | 1/2003 | Early et al. | |
| 2003/0139999 A1 | 7/2003 | Rowe | |
| 2003/0144942 A1 | 7/2003 | Sobek | |
| 2004/0033797 A1 | 2/2004 | Ravisto et al. | |
| 2004/0039694 A1 | 2/2004 | Dunn et al. | |
| 2004/0052403 A1 | 3/2004 | Houvener | |
| 2004/0052404 A1 | 3/2004 | Houvener | |
| 2004/0109588 A1 | 6/2004 | Houvener | |
| 2004/0111361 A1 | 6/2004 | Griffiths et al. | |
| 2004/0111370 A1 | 6/2004 | Saylors et al. | |
| 2004/0225545 A1 | 11/2004 | Turner et al. | |
| 2005/0033691 A1 | 2/2005 | Whewell et al. | |
| 2005/0037731 A1 | 2/2005 | Whewell et al. | |
| 2005/0044018 A1 | 2/2005 | Whewell | |
| 2005/0256802 A1 | 11/2005 | Ammermann et al. | |
| 2006/0129504 A1 | 6/2006 | Nakajima | |
| 2006/0212393 A1 | 9/2006 | Lindsay Brown | |
| 2006/0294025 A1 | 12/2006 | Mengerink | |
| 2007/0287413 A1 | 12/2007 | Kleitsch et al. | |
| 2009/0043644 A1* | 2/2009 | Wilkman | 705/10 |

FOREIGN PATENT DOCUMENTS

| | | | |
|---|---|---|---|
| WO | 9900773 A1 | 1/1999 | |
| WO | 9933034 A1 | 7/1999 | |
| WO | 0079771 A1 | 12/2000 | |

OTHER PUBLICATIONS

U.S. Appl. No. 60/144,633, filed Jul. 19, 1999; Title: Virally Marketed Wallet Sofware for Portable Computers; Applicant(s): Levchin, Max et al.

Wireless Ethernet Compatibility Alliance (WWCA) Announces Independent Test Lab and Wi-Fi Technology Brand, Wi-Fi Alliance press release, Sep. 15, 1999.

Groeller, Greg, Gee Whiz Features Aren't so Remote: Orlando Sentinel, May 2, 1999, p. H1.

Revett, MC; South, GJ, Consumer Devices for eCommerce Access, BT Technology Journal; Jul. 1999; pp. 112-123, vol. 17, No. 3.

Texas Instruments Tiris News, on the Way to Becoming the Standard for Automatic Retail Fueling, 1998, pp. 1-12, Issue No. 18, International Newsletter of the Tiris Group, Texas Instruments.

75-633127, Jadlow Communication Company, LLC, Trademark File History, obtained Dec. 22, 2003.

Bluetooth, 75643769, TESS Printout, Jan. 5, 2004.

Bluetooth, 76054633, TESS Printout, Jan. 5, 2004.

Wi-Fi, 2525795, TESS Printout, Dec. 29, 2003.

"Sprint and eONE Global Announce Plans to Create First Interrooperable Mobile Payments Network". eONE Global. May 22, 2002 <http://www2.pmewswire.com/cgl-bin/stories.pl?ACCT+104&STORY=/www/story/05-22-...>.

Toward the Single Account; United States Banker. Company/Corporate Profiel/Review; Dec. 16, 1974, pp. 5-6.

Application as Filed on May 16, 2006, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Preliminary Amendment dated May 16, 2006, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Preliminary Amendment dated Feb. 8, 2008, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Restriction Requirement dated Mar. 31, 2008, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Response to Restriction Requirement dated Jul. 28, 2008, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Non-Final Office Action dated Oct. 16, 2008, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Amendment dated Apr. 16, 2009, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Final Office Action dated Jul. 24, 2009, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Examiner Interview Summary dated Sep. 1, 2009, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Amendment and Interview Summary dated Sep. 16, 2009, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Non-Final Office Action dated Jul. 22, 2010, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Extension of Time dated Oct. 25, 2010, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Extension of Time dated Nov. 30, 2010, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

Notice of Abandonment dated Mar. 16, 2011, in U.S. Appl. No. 11/434,939 entitled Method and Point of Sale Terminal Device for Making a Purchase Transaction Initiated With a Wireless Communications Device; filed May 16, 2006; Applicant: Rolf, Devon A.

* cited by examiner

SYSTEM AND METHOD FOR MOBILE PAYMENT AT POINT OF SALE

RELATED APPLICATIONS

This application is a continuation, claiming priority benefit with regard to all common subject matter, of earlier-filed U.S. patent application Ser. No. 13/588,064, filed Aug. 17, 2012, now U.S. Pat. No. 8,504,472, issued Aug. 6, 2013, and entitled "ELECTRONIC PAYMENT METHOD FOR MAKING PAYMENTS USING A MOBILE IDENTIFIER" (the '472 patent). The '472 patent is a continuation, claiming priority benefit with regard to all common subject matter, of earlier-filed U.S. patent application Ser. No. 13/447,662, filed Apr. 16, 2012, now U.S. Pat. No. 8,249,982, issued Aug. 21, 2012, and entitled "ELECTRONIC PAYMENT METHOD FOR MAKING PAYMENTS USING A MOBILE IDENTIFIER" (the '982 patent). The '982 patent is a continuation, claiming priority benefit with regard to all common subject matter, of earlier-filed U.S. patent application Ser. No. 12/973,361, filed Dec. 20, 2010, now U.S. Pat. No. 8,224,746, issued Jul. 17, 2012, and entitled "METHOD FOR PROCESSING PAYMENT FOR A PURCHASE TRANSACTION" (the '746 patent). The '746 patent is a continuation, claiming priority benefit with regard to all common subject matter, of earlier-filed U.S. patent application Ser. No. 12/774,464, filed May 5, 2010, now U.S. Pat. No. 7,856,387, issued Dec. 21, 2010, and entitled "METHOD FOR FACILITATING A PURCHASE TRANSACTION USING AN ACCOUNT ASSOCIATED WITH A MEDIA ACCOUNT" (the '387 patent). The '387 patent is a continuation, claiming priority benefit with regard to all common subject matter, of earlier-filed U.S. patent application Ser. No. 10/668,409, filed Sep. 23, 2003, now U.S. Pat. No. 7,720,762, issued May 18, 2010, and entitled "SYSTEM AND METHOD FOR ELECTRONICALLY PROCESSING COMMERCIAL TRANSACTIONS BASED UPON THRESHOLD AMOUNT" (the '762 patent). The '762 patent is a non-provisional application, claiming priority benefit with all regard to all common subject matter, of earlier-filed U.S. Provisional Patent Application No. 60/415,894, filed Oct. 3, 2002. The identified earlier-filed patent application, patents, and provisional application are hereby incorporated by reference in their entirety into the present application.

The '982 patent is also a continuation, claiming priority benefit with regard to all common subject matter, of earlier-filed U.S. patent application Ser. No. 12/913,563, filed Oct. 27, 2010, and entitled "SYSTEM AND METHOD FOR MAKING A MOBILE PAYMENT DURING A VOICE COMMUNICATION" (the '563 Application). The '563 application is a continuation, claiming priority benefit with regard to all common subject matter, of earlier-filed U.S. patent application Ser. No. 11/434,939, filed May 16, 2006, and entitled "METHOD AND POINT OF SALE TERMINAL DEVICE FOR MAKING A PURCHASE TRANSACTION INITIATED WITH A WIRELESS COMMUNICATIONS DEVICE" (the '939 Application). The '939 application is a continuation, claiming priority benefit with regard to all common subject matter, of earlier-filed U.S. patent application Ser. No. 09/635,935, filed Aug. 10, 2000, now U.S. Pat. No. 7,376,583, issued May 20, 2008, and entitled "DEVICE FOR MAKING A TRANSACTION VIA A COMMUNICATIONS LINK" (the '583 patent). The '583 patent is a non-provisional application, claiming priority benefit with all regard to all common subject matter, of earlier-filed U.S. Provisional Patent Application Ser. No. 60/147,987, filed Aug. 10, 1999, and entitled "DEVICE, SYSTEM, AND METHOD FOR MAKING TRANSACTIONS VIA A WIRELESS COMMUNICATIONS LINK" (the '987 Application). The identified earlier-filed patent applications, patent, and provisional application are hereby incorporated by reference in their entirety into the present application.

BACKGROUND OF THE INVENTION

The present invention is directed to a system and method for electronically processing commercial transactions based upon threshold amount.

Electronic commerce systems, such as that described in my co-pending U.S. application Ser. No. 09/635,935, now U.S. Pat. No. 7,376,583, entitled "Device, System and Method for Making Transactions Via a Communications Link", which is hereby incorporated by reference, have been proposed. Such a system permits the user of a mobile phone, personal computing device (such as a PDA), a personal computer, telephone, interactive television, or interactive radio to make commercial transactions, such as the buying of goods or services, using the device. As described, a transaction may be settled electronically using a debit or credit account of the user. As further described, the account used to settle the transaction may be the service account corresponding to the communications service associated with the device, or may be another account, such as, for example, a VISA or Master Card account.

Communications commerce systems such as that described would offer providers of communications, media, or content services the ability to provide additional financial services such as transaction processing, settlement, and guarantee services. Additionally, use of such systems, once developed, will provide the service providers with increased opportunities to build and maintain customer relationships.

Of course, expansion of the services offered by a communications, media, or content service organization to include commerce services which permit a user to settle a commercial transaction with the communications, content, or media account, will increase the volume of work the provider must perform. Additionally, should the provider further provide guarantee services, alone or more likely with relationships with other organizations, the provider's financial exposure is increased.

Accordingly, the need exists for a method, system and business model which offers a communications, content or media service provider the ability to provide expanded financial transaction processing services to its customers, while controlling work load and exposure to financial risk. The present invention meets these and other needs.

SUMMARY OF THE INVENTION

The present invention is a system, method and business model for electronically processing commercial transactions. In particular, the present invention is useful in mobile commerce and telecommerce environments.

The components of the present invention include an input device through which a user initiates a commercial transaction. The input device may be any type of input device, including a telephone, personal computing device, wireless communications device, interactive television, interactive radio, etc. Additionally, the input device may be a conventional card reader or a biometric device.

The input device communicates through a communications system with a processor and, particularly, a server. As will be appreciated, the input device may communicate via a point of sale terminal to the central processor. The processor performs tasks of user authentication and fraud control, and retrieves account information associated with the user, and account information associated with a merchant at which the user is making a transaction. In short, the central processor performs the functions of authenticating the parties to the transaction and settling the transaction. Additionally, the central processor may process the data associated with the settlement in such a manner that billing outputs may be provided to the user and/or merchant, or that information may be transmitted to an additional processor or party for fulfillment of the output solutions and customer care.

The components of such a system will be readily understood from U.S. patent application Ser. No. 09/635,935, which has been incorporated herein by reference.

In the first embodiment of the present invention, a user of a communications service, a media service, or a content service, has first and second financial accounts associated with the service. For example, the communications service may be a mobile wireless, fixed wireless, satellite, or non-wireless telecommunications service. Media service may be a cable service, satellite radio service, or other media service. A content service may be a content aggregator or web-portal service, such as made popular by America On Line and others.

In accordance with the present invention, the first financial account is an account that is, or is associated with, the account associated with the service. The second account is a financial account that is not associated with the service, but may still be provided by the service provider. In accordance with the principles of the present invention, when a user of a communications service initiates a communication for the purpose of making a commercial transaction, the central processor performs the functions of authorizing the user and the merchant with which the user intends to conduct a transaction, and retrieves account information associated with the user and the merchant. The central processor determines a monetary amount associated with the transaction and then determines whether that amount meets or is greater than a selected threshold amount. When the amount does not meet, or is not greater than (depending upon the construct of the invention), the selected threshold amount, the central processor settles the transaction using the first account of the user and an account of the merchant. When, however, the amount associated with the transaction to be deducted does meet or is greater than the selected threshold amount, the central processor settles the transaction of the second account of the user.

Accordingly, in accordance with the present invention, the service provider can establish a threshold amount per transaction which defines the monetary magnitude of a transaction the provider is willing to settle. As will be appreciated, this amount may also be associated with an amount that the service provider is willing to guarantee, alone or in conjunction with other parties. When, however, the amount associated with the transaction is greater than the threshold, the burden of settling that transaction and/or guaranteeing it is passed to another party or other parties associated with the second account of the user.

For example, the present invention permits a service provider to permit transactions up to a selected amount to be billed directly to an account associated with the service, whereas any transaction over that amount is settled utilizing an account that is not associated with the service provider or is not directly associated with the service.

In a second embodiment of the present invention, which is very similar to the first embodiment, when the central processor retrieves account information associated with the user, the processor also retrieves the sum of transactions made within a particular period of time (such as a billing cycle) and, preferably, the sum of transactions made within the particular time period that have not been paid. In this embodiment, after all authorizations have been obtained, the processor determines whether the sum of those transactions made previously within the period and the monetary amount associated with the present transaction to be processed meet or are greater than a selected threshold amount. The processing then proceeds as described above, such that when the sum of the transactions does not meet or is not greater than a selected threshold amount, the processor settles a transaction using a first account of a user, that being the account associated with the service provider. When, however, the sum of those transactions within the period do meet or are greater than a selected threshold, the processor settles a transaction using a second account of the user, where that account is not associated with the corresponding service.

Accordingly, this embodiment of the invention permits a service provider to control the monetary amounts to be associated with the account within a period, and is not as concerned with the individual amount of the transaction.

As will be understood and appreciated, features of the first and second embodiments can be combined. Additionally, it should be understood that a modification to the second embodiment includes looking at the number of transactions made within a particular period, alone or in conjunction with the dollar amounts associated with the transaction. Accordingly, in the simplest form of modification, a service provider could elect to permit a certain number of transactions to be billed to its account, and when that number of transactions is exceeded within a particular time frame, such as a one month billing cycle, additional transactions would be settled using a second account of the user, where that account is not associated with the service provider.

In still another embodiment of the present invention, the invention operates very similarly to the second embodiment described above, although retrieves an account balance associated with the user when making a determination of how to settle the present transaction. Accordingly, if an outstanding balance of the user does not meet or is not greater than a selected threshold, the balance associated with the account is not limited to a particular time frame. As in the previous embodiment, in such an instance, the processor settles the transaction using the first account of the user, that being the account associated with the corresponding service. When, however, the outstanding balance of the user is greater than a selected threshold, the processor proceeds to settle the transaction using a second account of the user. In accordance with this embodiment of the invention, the outstanding balance may include only those monetary amounts associated with transactions made by the user using the account, plus interest (if any), or may also include an outstanding balance associated with the service itself. Thus, for example, when the service involved is a wireless communications account, and the user is using his or her wireless telephone to make commercial transactions, the processor could look only at the balance associated with cumulative transactions made with the account or, alternatively, could also take into account charges owed for use of the wireless communications device for phone calls or Internet access, according to the particular service plan of the use.

It should be understood and appreciated that the present invention will employ additional tools for determining when the user cannot settle transactions using the second account, such as when the balance of that account is exceeded, or the user has failed to pay within a defined time period, etc. In such an instance, settlement of the transaction would not proceed, and an indication can be provided to the merchant, the point of sale terminal, and/or the communications device that processing could not continue.

DETAILED DESCRIPTION OF THE INVENTION

Figure 1:
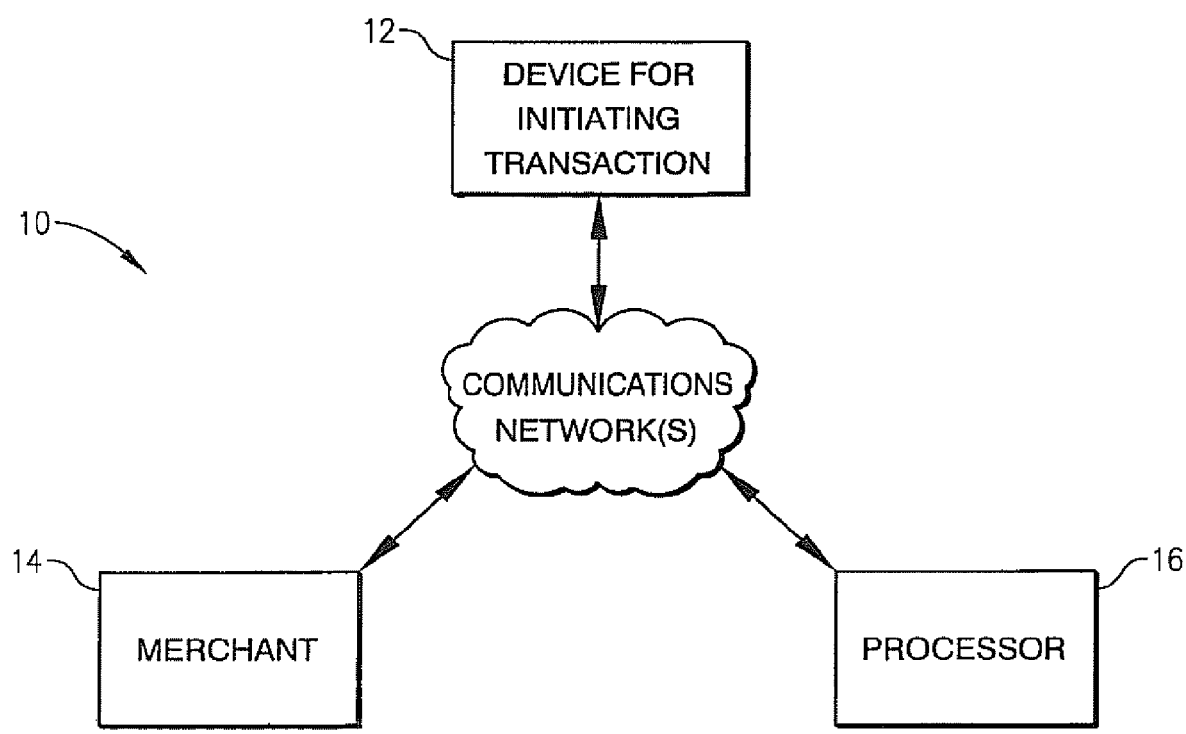
FIG. 1 is a block diagram of a system of the present invention.

With reference initially to FIG. 1, a system for conducting electronic transactions is denoted generally by the reference number 10, and is illustrated and described. System 10 has a communications device 12, which is employed by a user for initiating transactions. Communications device 12 may be any type of electronic communications device, including but not limited to, a wireless telephone, a personal digital assistant (PDA) with wireless data communications capabilities, a portable computer (such as a laptop computer), a personal computer, a telephone, an interactive radio or interactive television, or a telematics device. It should be understood and appreciated that communications device 12 has an input and an output, and preferably includes at least one input and at least one output. Examples of inputs include, but are not limited to, biometric devices, microphones for receiving voice instructions, touch screen displays, keypads, etc. Examples of outputs include, but are not limited to, speakers for providing voice instructions and prompts, displays, etc. Alternatively, device 12 may represent a reader, such as a card reader or biometric reader, for receiving information pertaining to an account or account holder. In other words, the present invention is useful independently of the manner in which a transaction is initiated.

Additionally, system 10 includes a merchant terminal 14. A merchant terminal 14 is a terminal associated with a merchant in which a transaction is made, and may include a web site or a point of sale terminal. System 10 further includes a central processing station 16 at which electronic transactions made between device 12 and merchant terminal 14 are processed. The term "central processing facility" encompasses separately or in combination with a processing facility associated with the device 12 or a subscriber thereof, a processing facility associated with a point of sale terminal, a merchant, or a financial institution. In particular, central processing station 16 performs a variety of transactions, such as user and merchant authorization, retrieval of information associated with the merchant and user, processing of the transaction, including settlement, and storage or transmittal of information for purposes of financial guarantee of the transaction, record maintenance, and provision of billing statements. In short, it should be understood that central processing facility 16 is adapted to process, transact, and/or account for sales made by a user utilizing communications device 12.

A communications network, or networks, denoted generally by the reference numeral 14, is/are utilized for connection of the components of the system. It should be understood that the communications network may include wireless communications or fixed line/fiber optic/cable communications networks, and may generally include Local Area Networks (LANS), Wide Area Networks (WANS), or a combination thereof.

Accordingly, system 10 is shown schematically for the purpose of representing any electronic communication system via which a user may initiate and make a purchase of goods or services with a merchant, regardless of whether the user is located at the locality of the merchant or remotely therefrom.

Operation of system 10 will be generally understood with reference to U.S. patent application Ser. No. 09/635,935, now U.S. Pat. No. 7,376,583, which is incorporated herein by reference. In particular, the user of device 12 initiates an application to conduct a commercial transaction with merchant 14, and a central processing station 16 authorizes and settles that transaction.

In one embodiment of the present invention, an on-line transaction system is provided, wherein a plurality of merchant point of sale terminals 14 are connected via communications links to the remote central processing facility 16. Subscribers of telephone service may utilize their portable cellular telephone to make purchases at the point of sale terminals. A "user's account" and a "merchant's account" are connected to the central processing facility 16. It should be understood and appreciated that these accounts may in fact be electronic accounts stored in memory at the location of the central processing facility or, alternatively, at a location remote from the central processing facility such that communication with the respective accounts requires a communication link via the communications network. Thus, for example, the user account may be a bank account maintained by a financial institution, or may be a credit card account. Similarly, the merchant's account may be an account maintained by a financial institution, such that the merchant's account is in fact a memory located remotely from central processing facility 16.

A plurality of accounts of the user of communications device 12 may be associated with the device 12 in a database memory. Then, utilizing an input of communications device 12, such as a keypad input or when voice recognition technology is provided, utilizing a microphone, the user may select that account manner to which he or she wishes the transaction to be processed. In a preferred embodiment, one of the plurality of accounts is "preferred", and is utilized as a default.

The point of sale terminal 14 has a processor. Connected to processor are a printer, a display, an optional memory, an encoder/decoder, a first input, such as a keypad input, and a second input, such as a scanner or bar code reader. Connected to the encoder/decoder is a transceiver, including transmitter and receiver, which in turn is connected to an antenna. Additionally, processor is capable of connecting to a standard communications network, such as a wired or wireless communications network. In the case where the processor utilizes wireless transmissions to connect to a communications network, an additional encoder, transceiver, and antenna may be employed. Again, encoder/decoder (and an additional encoder if utilized) is preferably a DTMF encoder/decoder. Such an encoder/decoder may be utilized for encoding conventional DTMF signals for the transmission of data. In other words, when the point of sale terminal 14 is receiving data from communications device 12, that data may be transmitted with DTMF signals having been encoded by the encoder of the communications device 12, and then whereupon it will be decoded by the encoder/decoder at the point of sale terminal 14.

Additionally, it should be understood that a point of sale terminal may be an interactive television set or computer terminal. In such an instance, a television set or computer terminal operates in the same manner as a networked point of sale terminal as previously described. Accordingly, the interactive television set or computer terminal may itself be adapted to receive wireless communication signals from the communications device 12 or, alternatively, the wireless communications device 12 may be utilized to perform financial transactions, such as buying goods and services displayed over the computer terminal or television set, by communicating with the central processing facility 16 which in turn communicates with the television set or computer terminal or, more preferably, the source of the content displayed at the television set or computer terminal.

As still another security measure provided by system 10, a visual image of an authorized user of communications device 12 may be stored by the central processing facility 16 in database memory. Then, upon a link between the communications device 12 and the point of sale terminal 14 being established, either directly or via the central processing facility 16, the processor of central processing facility may retrieve the image(s) from database memory and transmit it to point of sale terminal 14 for display on a display screen thereof. In other words, in those instances where point of sale terminal 14 is one which an operator operates the terminal, the operator may provide a visual comparison between the image on the screen and the user of device 12.

An encoded transponder which transmits a code when properly excited electronically may be placed within the communications device 12. Additionally, the circuitry for generating an electrical field about the point of sale terminal 14 may be placed within a point of sale terminal such that, when the communications device 12 is within the generated field, the transponder is electrically excited and transmits encoded information to the point of sale terminal 14.

The encoded transponder may be encoded with information corresponding to the telephone number or subscriber of the communications device 12. For example, the encoded information may be the telephone number in the event the device is a wireless communications device. Alternatively, the encoded number may simply be a unique number which, when transferred to the point of sale terminal 14, is transmitted to the central processing facility 16, where it is associated with an account corresponding to the device 12.

The system 10 may be implemented such that transmittal of the encoded information requires additional input by the user, or more preferably, such that a final input is required before financial settlement takes place. In other words, user entries involve first establishing the necessary communications, and then making an entry for authorizing the actual sale. An "authorization" entry may be made after the user of communications device 12 has an opportunity to see the "sales price", as indicated at the point of sale terminal 14, or as provided by an operator at the terminal, or after having viewed or heard data transmitted to the communications device 12 indicative of the sales price associated with the sale being made. Additionally, the present invention may require the user to input a personal identification number (PIN) to be input by voice command or by keypad input. System 10 may require the user to verbally input, via the microphone, a password.

Once connected to the central processing facility 16, the user may use a keypad of the wireless communications device 12 (or the microphone for transmitting voice signals) for inputting an identification number (or telephone number) of the point of sale terminal 14 at which a transaction is made. That information, when received by the central processing facility 16, permits the processing facility to automatically establish a communications link with the point of sale terminal 14 at which a transaction is to be made, if such a link is not already established.

Additionally, although not necessary, a communications link may be established directly between communications device 12 and point of sale terminal 14. Additionally, the various communications links may or may not be present simultaneously.

In embodiments of the present invention, the central processing facility 16, and particularly a processor, determines the location of communications device 12. This determination is made by receipt of data, via the wireless communications link, from communications device 12. Particularly, that data includes the location or proximate location of the device 12, as determined in one of a variety of conventional manners.

Once the location of communication device 12 is established, processing advances, wherein the processor of central processing facility 16 retrieves data from memory indicative of point of sale terminals 14. In particular, geographic location data corresponding to each point of sale terminal 14 is stored in database memory of central processing facility 16. Thus, and according with one method, processor retrieves locations of point of sale terminals 14 within a predetermined distance from the then current location of communication device 12. Alternatively, the processor may simply retrieve a selected number of point of sale terminals that are closest in location to the then current location of communication device 12. The retrieved data is prioritized in the order from the closest to the then current location of communications device 12, to the farthest, and that data is transmitted to communications device 12. The data may be transmitted in data format, or voice synthesization, or recording format, although is preferably transmitted in data format, such that the data appears on the display screen of communication device 12. The user determines whether the initially indicated point of sale terminal 14 is the actual terminal 14 at which a transaction is desired to be made and, if so, that terminal is selected such as by use of keypad input or switch, toggle, or rotary input. When, however, the initially listed point of sale terminal 14 is not the terminal at which a transaction is desired to be made, the user then makes an appropriate input, e.g., with a keypad, input, or microphone, where voice recognition is provided, to select the next point of sale terminal on the list, and so on, until the actually desired point of sale terminal 14 is presented, or all terminals on the list have been processed. In particular, the user retrieves additional point of sale terminals on the list, until the desired point of sale terminal is presented and selected.

Additionally, system 10 of the present invention permits a number of different security measures to be employed. For example, in addition to encoding and/or otherwise encrypting data to be transmitted within system 10, other safeguards may be employed. For example, before completing a transaction at point of sale terminal 14 utilizing communications device 12, system 10 may require the user of communications device 12 to enter a code, such as a PIN, utilizing a keypad or, where voice recognition technology is provided, utilizing voice commands entered through a microphone of the mobile communications device 12. Additionally, or alternatively, voice recognition itself could be utilized as a security measure. In this regard, system 10 may require the user to verbally input, via a microphone of device 12, a password, the voice characteristics of which will have been previously stored in a data base memory of the central processing facility. In other words, the central processing facility can then perform a comparison of the voice command with that which was stored in memory, to provide a confirmation that the user of device 12 is an authorized user. As will be understood and appreciated, a plurality of users of device 12, such as members of a family, have voice commands on record, such that more than one user can utilize device 12.

Additionally, system 10 of the present invention permits a number of different security measures to be employed. For example, in addition to encoding and/or otherwise encrypting data to be transmitted within system 10, other safeguards may be employed. For example, before completing a transaction at point of sale terminal 14 utilizing communications device 12, system 10 may require the user of communications device 12 to enter a code, such as a PIN, utilizing a keypad or, where voice recognition technology is provided, utilizing voice commands entered through a microphone of the mobile communications device 12. Additionally, or alternatively, voice recognition itself could be utilized as a security measure. In this regard, system 10 may require the user to verbally input, via a microphone of device 12, a password, the voice characteristics of which will have been previously stored in a data base memory of the central processing facility. In other words, the central processing facility can then perform a comparison of the voice command with that which was stored in memory, to provide a confirmation that the user of device 12 is an authorized user. As will be understood and appreciated, a plurality of users of device 12, such as members of a family, have voice commands on record, such that more than one user can utilize device 12.

Figure 2:
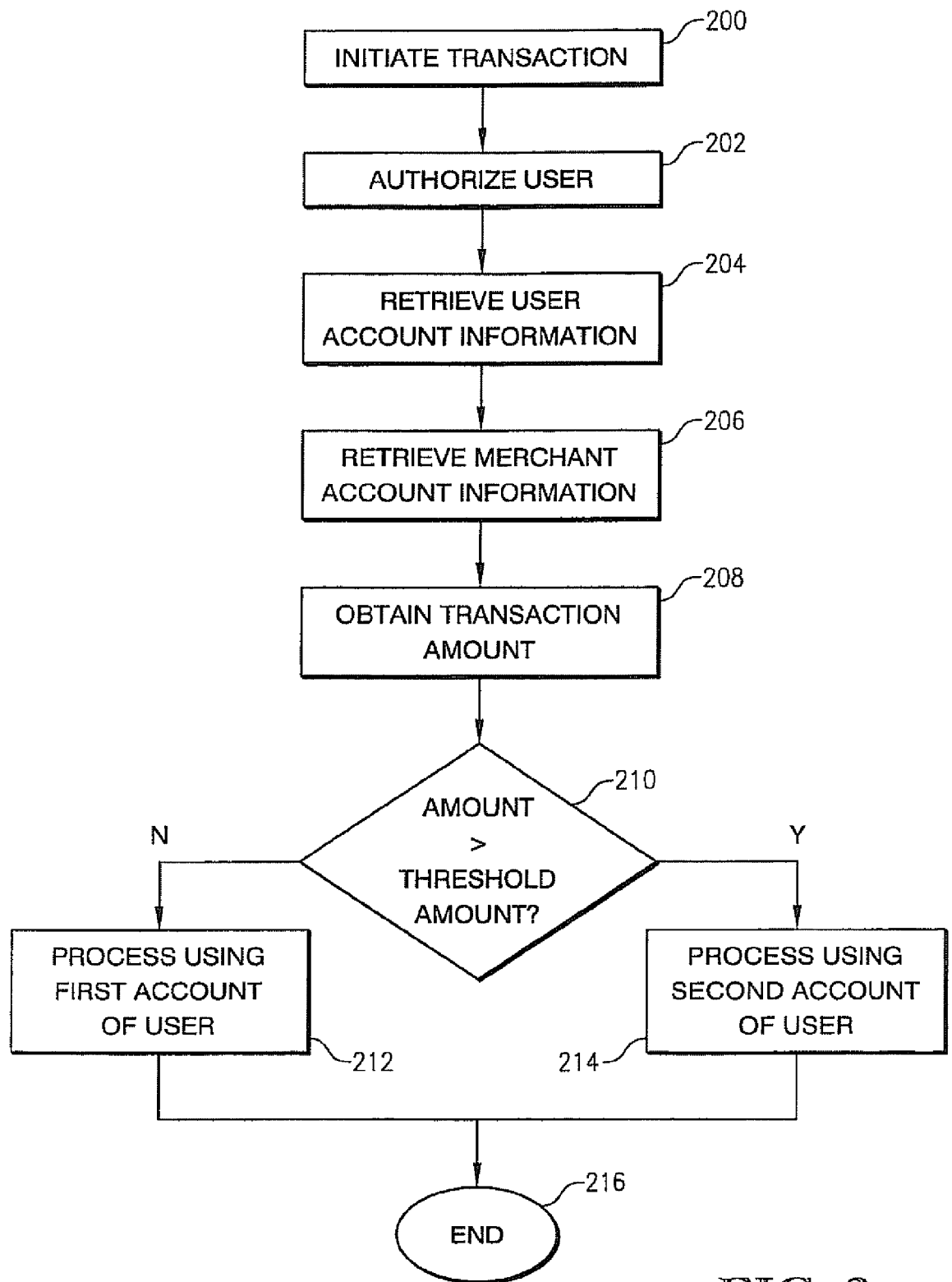
FIGS. 2-4 are flow charts illustrating the various embodiments of the present invention.

With reference now to FIG. 2, a preferred operation of system 10 and, particularly, a preferred method associated with system 10 of the present invention is illustrated and described. It should be understood that the flow-chart illustrates a preferred embodiment, but that certain steps may be formed in a different order or sequence or may be divided into separate steps. For example, when initially retrieving a user's account information, the system may retrieve information pertaining to only one account of the user, with information pertaining to a second account being retrieved as needed. Alternatively, initial retrieval of user account information may involve retrieving account information about a plurality of accounts.

In accordance with the invention, a user or account holder has a first account associated with communications services (e.g., a wireless voice/data service) and a second account associated with a bank account or credit account. At step 200, a software application utilized to make a transaction with the merchant associated with terminal 14 is initiated. It will be understood that initiation of this application may be accomplished by user input on device 12, by merchant input on terminal 14 when device 12 is associated with terminal 14, or automatically upon initiation of the transaction. Upon initiation of the application in step 202, communication is made via communication network 14 to central processing station 16, at which the processor at central processing station 16 receives data from device 12 and merchant 14 and makes a determination of whether each is authorized. Customer/merchant authorization is known in the credit/debit card payment industry, and similar techniques may be employed here.

At steps 204, 206, central processing station 16 retrieves information stored in memory and associated with the user and his or her accounts and the merchant and its account. At step 208, central processing station 16 obtains information, preferably from merchant terminal 14 of a monetary amount associated with a transaction to be conducted between the user of device 12 and the merchant associated with merchant terminal 14.

In accordance with the principles of the present invention, at step 210, central processing station 16 makes an electronic determination whether the monetary amount associated with the transaction has reached a selected threshold amount. As will be understood and appreciated, the actual calculation to be made at this step 210 may be a step to determine the monetary amount is less than, is less than or equal to, is greater than or equal to, or greater than a threshold amount. For purposes of clarity and simplicity, this application will set forth a preferred embodiment in which the central processing unit makes a determination whether the monetary amount associated with the transaction is greater than a threshold amount, but it will be appreciated that other determinations could be made.

When it is determined at step 210 that the monetary amount associated with a transaction is not greater than the selected threshold amount, processing advances to step 212 and the processor makes an accounting and settles the financial transaction using the account of the merchant and a first selected account of the user.

When, however, it is determined that at step 210 that the monetary amount associated with the transaction is greater than the selected threshold, processing advances to step 214 at which the processor processes the financial transaction using the account of the merchant and the second account of the user, where that second account is not associated with a service corresponding to device 12. Following the processing at step 212 or 214, processing advances to the end of this routine, indicated by reference numeral 216. It will be understood and appreciated that additional processing steps could be employed, in that data indicative of the transaction will be stored in memory associated with the utilized accounts, and the information may be transmitted to one or more other locations for the purpose of satisfying or accounting for financial guarantees for the transaction and/or for the purpose of providing information to be utilized in invoicing. It will also be understood and appreciated that a data base associated with central processor 16 at the same location may be utilized for such purposes, and that any transmission of data to another location may occur upon completion of the routine set forth in FIG. 2, or subsequently at periodic intervals by way of mass data transmission or batch file transmission.

In accordance with an aspect of the invention, the threshold amount utilized in the decision process at step 210 is data indicative of a monetary amount, stored in memory. Preferably, that threshold amount is established by the service provider associated with the first account. Accordingly, it should be understood that the threshold amount may be an amount that is identical for each of the service provider's customers, or at least those customers of the service provider which has established this feature on his or her account. Alternatively, the threshold amount may be unique to each user, such that a user with a greater income or better credit history, for example, may have a greater threshold amount than a user with less income or with less desirable credit history. Obviously, various criteria other than those listed here can be used to determine the particular threshold amount for each user. Accordingly, the present invention provides a service provider the ability to account for transactions directly to the account of a user, where that account is associated with the service provided by the service provider (such as a cable or satellite account, interactive radio account, communications telephone or wireless communications account, Internet access account, etc.) and, particularly, to make an accounting to that associated account for dollar amounts up to a threshold. It should, of course, be understood and appreciated that the invention can be employed such that only monetary amounts greater than a particular threshold be settled to the account, with lesser amounts being settled to the second account that is not associated with the service provider, although it is believed that the formerly described embodiment may be the most practical.

Additionally, in one embodiment, purchases accounted for on the user's account associated with the communications media portal service provider are invoiced to the user on a periodic basis, preferably with an invoice of the periodic charges associated with use of the communications, media or portal services. In this regard, payment may be required in full each month, or the account may operate as a revolving credit account and accumulate interest on unpaid balances. Alternatively, this account may be a deposit account into which the user may deposit funds from which debit transactions may be made in accordance with the principles of the invention, in which case the user would preferably receive a periodic statement of transactions. In such a case, charges associated with use of the communication media or portal service may be periodically applied against the balance in accordance with the principles of the present invention.

The second account may be a debit or a credit account and may be offered by the service provider or another institution. Understandably, any debit accounts may be set-up so as to accrue interest on funds in the account.

In a variation of the embodiment illustrated in FIG. 2, and as would apply to the other embodiments described herein, an additional processing step could be employed such that a plurality of ranges of monetary amounts are established. In such an embodiment, a different account may be associated with each range of amounts, such that a transaction falling within a particular range will be accounted utilizing the account corresponding to that range. In a preferred embodiment of this variation, three such ranges are established, whereby a range associated with the least and the greatest monetary amounts are accounted for using the second account, not associated with the service provider, while the account associated with the service provider is utilized for the middle range of transactions. In this way, very small micropayments or larger payments would be accounted for utilizing an account not associated with the service provider, while a selected middle range of transactions would utilized the account associated with the service provider. Other variations could be employed.

Figure 3:
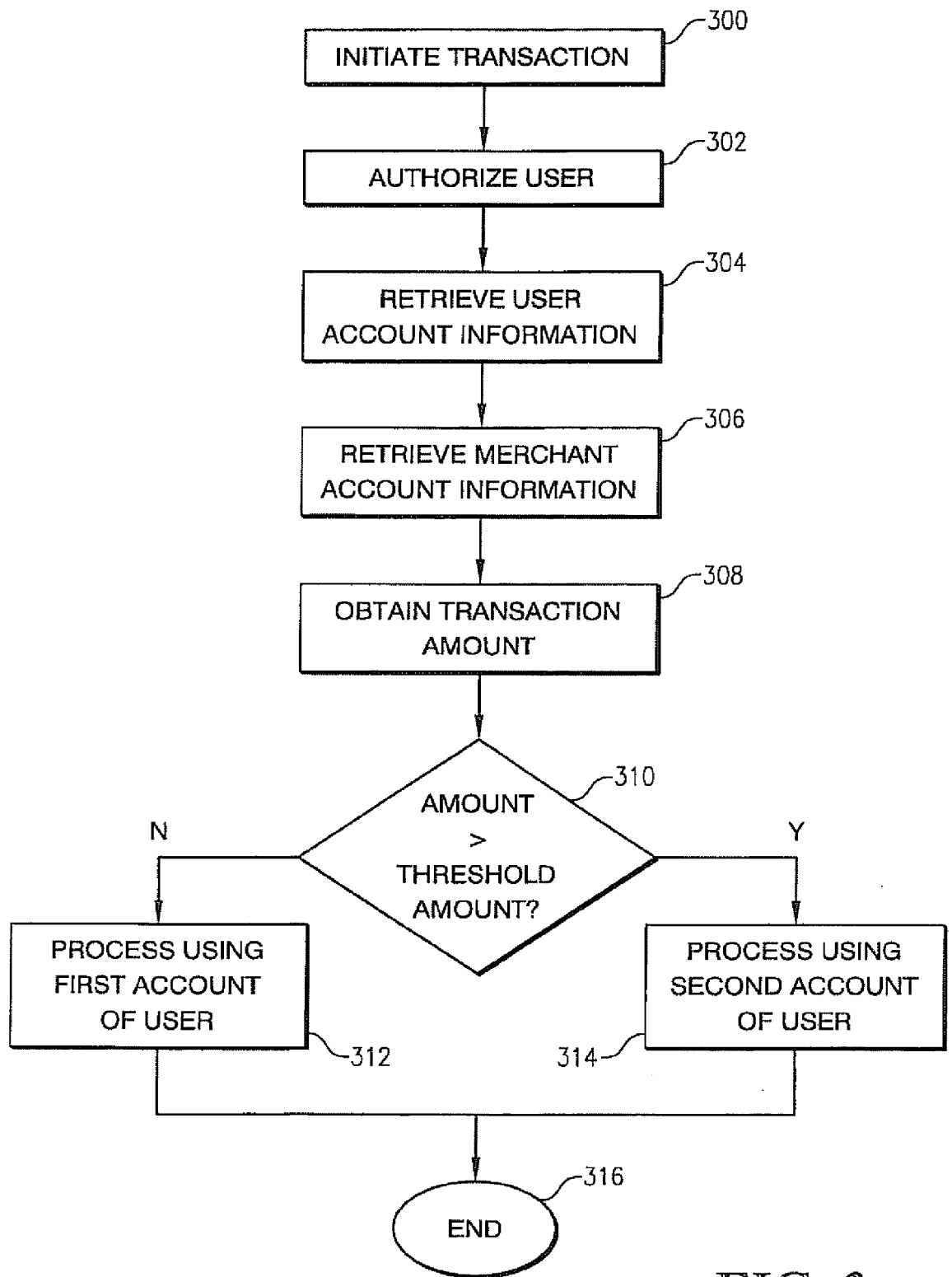

With reference now to FIG. 3, an alternate embodiment of the present invention and, particularly, of the method and operation of system 10 of the present invention is illustrated and described. The steps of the embodiment of FIG. 3 are very similar to those of FIG. 2, with the following exceptions. At step 304, when the central processing station 16 retrieves the account information of the user, the central processing station 16 also retrieves a monetary amount of charges that have accumulated within a selected time period, such as the most recent billing cycle (perhaps one month) of the service account with which device 12 is associated. It should be understood that the monetary amount retrieved may be the sum of all purchase transactions made utilizing device 12 for the given period, or may be that sum plus charges associated with conventional use of the device, such as Internet access or telephone usage.

In any event, at step 308, the monetary amount retrieved is added to the monetary amount of the transaction to be processed. Then, at step 310, the central processing station 16 makes a determination of whether that cumulative amount is greater than a selected threshold, and processing proceeds step 312 or 314, and then onto 316, depending upon the outcome of the decision making step at 310.

Accordingly, the embodiment of the invention illustrated in FIG. 3, unlike the embodiment of FIG. 2, which looks at the monetary amount associated with the specific transaction, rather looks at the cumulative monetary amount owed for a given billing cycle or other select periods.

Figure 4:
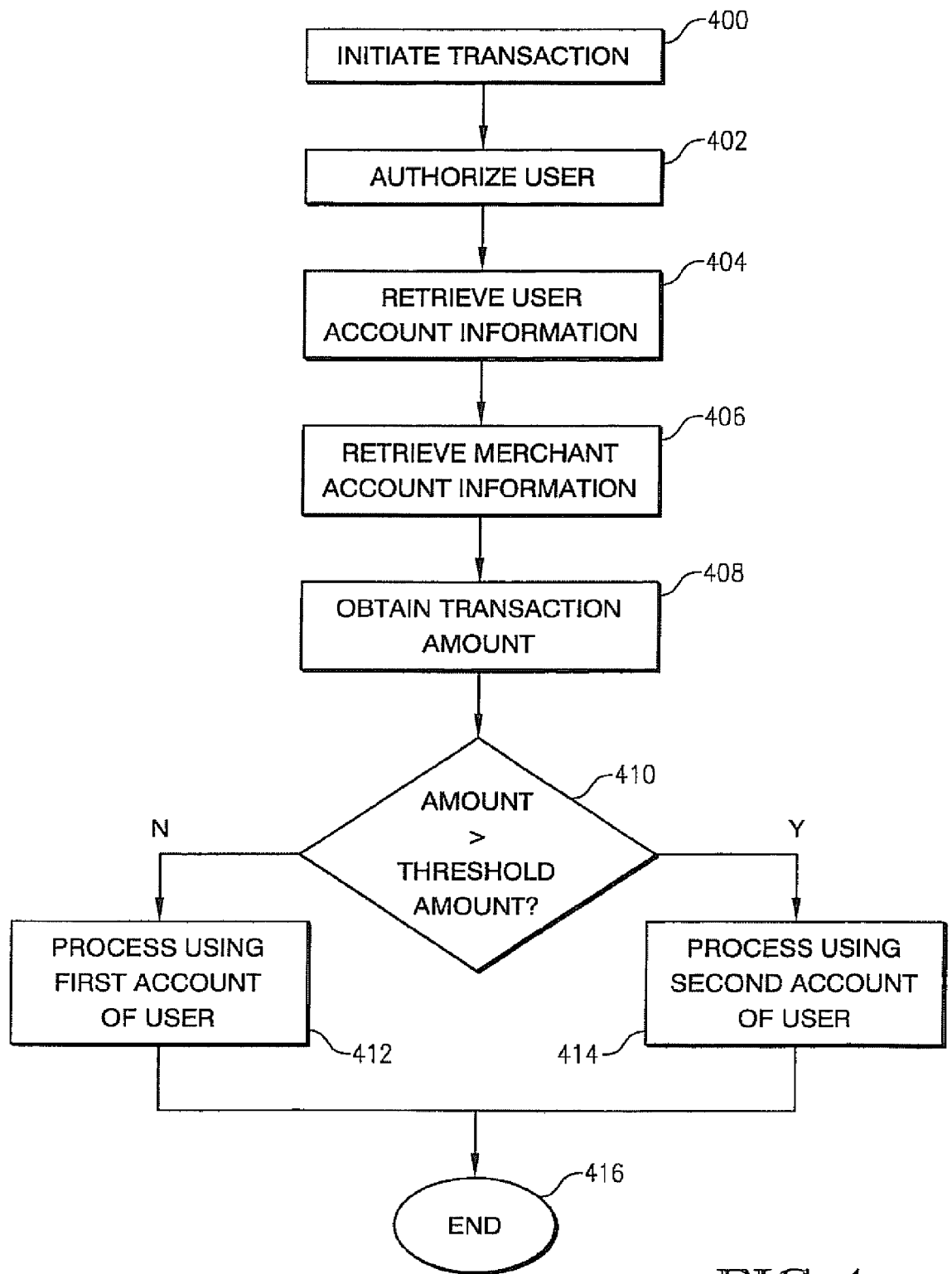

With reference now to FIG. 4, an additional embodiment of the invention is illustrated and described.

In particular, in the embodiment in FIG. 4, processing is substantially similar to that of the embodiments illustrated and described with respect to FIGS. 2 and 3, with the following notable exceptions. In this embodiment, at step 404, when central processing station 16 retrieves user account information, information about the user's balance in the account is retrieved. In this regard, unlike the embodiment of FIG. 3, illustrated and described with respect to FIG. 3, the embodiment of FIG. 4 is not concerned with a particular time period associated with the accumulated charges. Accordingly, data indicative of a monetary amount associated with transactions made with the first account associated with the service provider (including if desired any charges associated with the services other than transactions and interest, if any) are retrieved. In accordance with the preferred embodiment of this invention if the cumulative amount is greater than the threshold, as determined at step 410, then central processing station 16 will settle the transaction utilizing the second account which is not associated with the user. According to one preferred approach of accomplishing this determination, the retrieved cumulative monetary amount (i.e., the balance) associated with the first account is added to the monetary amount to be associated with the transaction to be made (as indicated at step 408), and that summed amount is compared with the selected threshold amounts at step 410, and then processing advances onto step 412 or 414, depending upon the outcome of the decision making step at 410.

From the foregoing, it will be seen that this invention is one well adapted to attain all the ends and objects hereinabove set forth, together with other advantages which are obvious and which are inherent to the invention.

It will be understood that certain features and subcombinations are of utility and may be employed without reference to other features and subcombinations. Additionally, it should be understood that features of the embodiments illustrated and described with reference to FIGS. 2-4 may be combined. This is contemplated by and is within the scope of the claims.

Since many possible embodiments may be made of the invention without departing from the scope thereof, it is understood that all matters herein set forth or shown in the accompanying drawings is to be interpreted as illustrative and not in a limiting sense.

The invention claimed is:

1. A method comprising:

providing a mobile communications device having a biometric input;

making an electronic payment system available to a plurality of users, wherein said making said electronic payment system available to a plurality of users comprises making said electronic payment system available to a first user using said mobile communications device in making a purchase transaction at a point of sale terminal;

storing information indicative of a payment account of the first user, wherein said information indicative of said payment account of the first user comprises an identifier corresponding to said payment account;

storing biometric information of said first user;

receiving information indicative of the identity of the first user based upon a biometric entry by the first user into said biometric input of the mobile communications device of the first user;

before said purchase transaction at said point of sale terminal is completed, comparing, using an electronic processor, the received information indicative of the identity of the first user, that is based upon the biometric input by the first user into the first user's mobile communications device, with the stored biometric information of the first user to confirm the identity of the first user;

further storing biometric information of a second user of the mobile communications device, wherein said second user is a family member of said first user, and wherein said storing said biometric information of the second user who is a family member of the first user is to enable confirmation of the identity of the family member to enable the family member to use the mobile communications device;

receiving information indicative of the identity of the family member of the first user based upon a biometric entry by the family member of the first user into said biometric input of the mobile communications device of the first user;

before allowing use of the mobile communications device by the family member of the first user, comparing, using an electronic processor, the received information indicative of the identity of the family member of the first user with the stored biometric information of the family member of the first user to confirm the identity of the family member of the first user.

2. The method as set forth in claim 1, wherein said storing said biometric information of the second user who is a family member of the first user is to enable confirmation of the identity of the family member as a security measure in said electronic payment system.

3. The method as set forth in claim 1, said method further comprising:

establishing a first communications interface between said mobile communications device and said point of sale terminal at which said purchase transaction is being made; and establishing a second communications interface between said mobile communications device and an electronic processor in said electronic payment system.

4. The method as set forth in claim 3, wherein said first communications interface is at a first frequency.

5. The method as set forth in claim 4, wherein said second communications interface is at a second frequency.

6. The method as set forth in claim 5, wherein said providing a mobile communications device further comprises providing a mobile communications device having a transponder, wherein said establishing a first communications interface comprises establishing said first communications interface wirelessly using said transponder in said mobile communications device.

7. The method as set forth in claim 6, wherein said establishing a second communications interface comprises establishing a second communications interface wirelessly via a local area wireless network.

8. The method as set forth in claim 6, wherein said establishing a second communications interface comprises establishing a second communications interface that utilizes a specification for a short range wireless communications link.

9. The method as set forth in claim 3, further comprising terminating said first communications interface before establishing said second communications interface.

10. The method as set forth in claim 3, said method comprising receiving in said electronic payment system via said second communications interface an authorization signal based upon an authorization entry made by the first user of the mobile communications device to authorize said purchase transaction.

11. The method as set forth in claim 10, said method comprising receiving in said mobile communications device from said electronic payment system via said second communications interface a confirmation signal to indicate that a payment for said purchase transaction has been made.

12. A system comprising:

a mobile communications device having a biometric input;

a memory, wherein said memory stores biometric information of a user of the mobile communications device, an electronic payments facility, wherein said electronic payments facility comprises an electronic processor, and wherein said electronic payments facility stores information indicative of a payment account of the user of said mobile communications device;

wherein, before processing a payment with said payment account for a purchase transaction made using said mobile communications device at a point of sale terminal, said system receives information indicative of the identity of the user of the mobile communications device based upon a biometric entry by the user into said biometric input of the mobile communications device of the user and compares said received information indicative of the identity of the user with said stored biometric information of the user to confirm the identity of the user, wherein a first communications interface is established between said mobile communications device and said point of sale terminal, wherein a second communications interface is established between said mobile communications device and said electronic processor; and wherein said system uses said first communications interface and said second communications interface in completing said purchase transaction.

13. The system as set forth in claim 12, wherein said user comprises a first user, wherein said system further stores biometric information of a second user of the mobile communications device, wherein said second user is a family member of said first user, wherein said system receives information indicative of the identity of the family member of the first user based upon a biometric entry by the family member of the first user into said biometric input of the mobile communications device, and wherein said system compares the received information indicative of the identity of the family member of the first user with the stored biometric information of the family member of the first user to confirm the identity of the family member before enabling the family member to use said mobile communications device.

14. The system as set forth in claim 12, wherein said first communications interface comprises a wireless interface at a first frequency and said second communications interface comprises a wireless interface at a second frequency.

15. The system as set forth in claim 12, wherein said mobile communications device further comprises a transponder, wherein said first communications interface comprises a first wireless communications interface using said transponder in said mobile communications device, and wherein said second communications interface comprises a second wireless communications interface using a local area wireless network.

16. The system as set forth in claim 12, wherein said mobile communications device further comprises a transponder, wherein said first communications interface comprises a first wireless communications interface using a local area wireless network, and wherein said second communications interface comprises a second wireless communications interface using said transponder in said mobile communications device.

17. The system as set forth in claim 12, wherein said second communications interface comprises a second wireless communications interface that utilizes a specification for a short range wireless communications link.

18. The system as set forth in claim 12, wherein said first communications interface is terminated before said second communications interface is established.

19. The system as set forth in claim 12, wherein said processor receives, via said second communications interface, an authorization signal based upon an authorization entry made by the first user of the mobile communications device to authorize said purchase transaction.

20. The system as set forth in claim 12, wherein said mobile communications device receives, from said processor via said second communications interface, a confirmation signal to indicate that said payment for said purchase transaction has been made.

21. The system as set forth in claim 12, wherein said mobile communications device further comprises a transponder for use in said first communications interface, wherein said system further comprises said point of sale terminal, wherein said point of sale terminal comprises a memory and an antenna and wherein said point of sale terminal generates a signal for exciting said transponder in said mobile communications device.

* * * * *